Patented Nov. 20, 1934

1,981,295

UNITED STATES PATENT OFFICE 1,981,295

ANTHRAQUINONE DERIVATIVE

Klaus Weinand, Leverkusen-I. G. Werk, Germany, assignor to General Aniline Works, Inc., New York, N. Y., a corporation of Delaware No Drawing. Application June 1, 1932, Serial No. 614,844. In Germany June 2, 1931

7 Claims. (Cl. 260—60)

The present invention relates to a process of preparing new anthraquinone derivatives and to the new products obtainable by said process.

In accordance with the invention new anthraquinone derivatives are obtained by reacting upon a compound of the formula:—

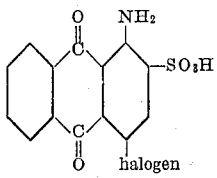

with an aminodiphenyl of the formula:—

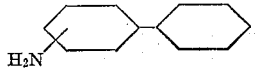

in which the nuclei may be partly or totally hydrogenated and/or substituted by halogen atoms, alkyl-, alkoxy- or acylamino groups. Compounds corresponding to this latter formula are, for example, 4-aminodiphenyl, 4-amino-2.4'-dichloro- or -dibromo-diphenyl, 4-amino-4'-methoxy- or ethoxydiphenyl, 4-aminodiphenyls being hydrogenated in the nucleus containing the amino group or in the other nucleus or in both the nuclei, 4-amino-4'-acetylamino-diphenyl, 4-amino-4'-propionylaminodiphenyl, 4-amino-3.3'-dimethoxy-4'-acetylaminodiphenyl etc.

The reaction is advantageously performed while heating the reaction components to a temperature between about 70° C. and about 100° C. in an aqueous medium, which may contain a water soluble organic solvent, such as methyl-alcohol, ethyl-alcohol, pyridine etc. and an acid binding agent, such as sodium hydroxide, sodium carbonate, sodium- or potassium acetate, sodium bicarbonate etc. Advantageously a copper catalyst, such as copper powder, cuprous or cupric chloride or another cuprous or cupric salt, is added to the reaction mixture.

The compounds thus obtainable are in form of their alkali metal salts blue to green crystals soluble in water with the same colorations, in concentrated sulfuric acid with a blue to bluish-green coloration. They dye wool from an acid bath blue to green shades fast to fulling and, furthermore, they have the remarkable property to dye vegetable fibers, such as cotton or viscose silk, strong and clear shades fast to light according to the customary methods for dyeing direct dyestuffs on the fibers mentioned.

The following examples illustrate the invention, without, however, limiting it thereto, the parts being by weight:—

Example 1

12 parts of 1-amino-4-bromo-anthraquinone-2-sulfonic acid, 6 parts of sodium carbonate, 10 parts of 4-amino-diphenyl and 0.5 part of cuprous chloride are boiled for 6-8 hours in 200 parts of water and 100 parts of alcohol. On cooling, the dyestuff crystallizes in blue needles, which are purified by redissolving from water.

The dyestuff dissolves in water with a greenish-blue coloration and dyes cotton and viscose silk from a sodium sulfate bath with the addition of sodium carbonate clear greenish-blue shades.

When in the above example the 4-aminodiphenyl is replaced by 4-amino-2.4'-dichlorodiphenyl, a similar dyestuff of a more reddish shade is produced. The latter starting material is prepared by nitrating 2.4'-diamino-diphenyl, diazotizing the 4-nitro-2.4'-diaminodiphenyl produced, introducing chlorine by Sandmeyer's reaction and reducing to the amino compound (melting point 83° C.)

Example 2

12 parts of 1-amino-4-bromo-anthraquinone-2-sulfonic acid, 12 parts of sodium bicarbonate, 5 parts of 1-(4'-aminophenyl)-cyclohexene-(1.2) (4'-aminotetrahydrodiphenyl, see for example German Patent No. 501,853) and 1 part by weight of cuprous chloride are suspended in 200 parts of water and 100 parts of alcohol, and heated to boiling for 4-5 hours. On cooling, the reaction product separates. It dyes cotton from a sodium sulfate bath a greenish-blue shade.

Example 3

12 parts of 1-amino-4-bromo-anthraquinone-2-sulfonic acid, 6 parts of sodium carbonate, 30 parts of 4-phenyl-cyclohexylamine (obtained by hydrogenating 4-amino-diphenyl- with hydrogen in the presence of a cobalt catalyst), 150 parts of water, 50 parts of alcohol and 1 part of cuprous chloride are boiled for 8-10 hours under reflux. The alcohol is distilled off by steam distillation and the dyestuff is separated by salting out. It dyes viscose silk from an aqueous sodium sulfate bath containing soap clear blue shades.

When in this example the 4-phenylcyclohexylamine is replaced by the ortho-cyclohexylidene-cyclohexylamine:—

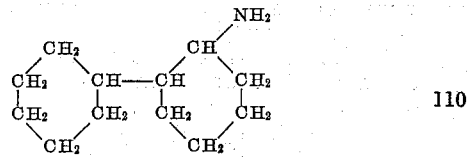

prepared from cyclohexylidene-cyclohexanone (I. Indian Chem. Soc. 7, 305–308) by transforming the same into its oxime and reducing the latter, a dyestuff is obtained possessing similar properties.

Example 4

12 parts of 1-amino-4-bromo-anthraquinone-2- sulfonic acid, 12 parts of sodium bicarbonate, 1 part of cuprous chloride, 6 parts of monoacetylbenzidine, 150 parts of water and 50 parts of methyl- or ethyl-alcohol are boiled for 2 hours under reflux. On cooling, the dyestuff separates in blue needles. It dyes cotton from an aqueous sodium sulfate bath greenish-blue shades.

*Example 5*

12 parts of 1-amino-4-bromoanthraquinone-2-sulfonic acid, 12 parts of sodium bicarbonate, 1 part of cuprous chloride, 6 parts of 4-amino-4'-acetylamino-3.3'-dimethoxy-diphenyl (see Journ. Chem. Soc. Vol. 97 (1910), page 720/26), 150 parts of water and 50 parts of methyl- or ethyl-alcohol are boiled for 2 hours under reflux. On cooling, the dyestuff separates in blue needles. It dyes cotton from a sodium sulfate bath green shades of good fastness properties, especially to light.

The same dyestuffs as described in the examples are obtained by replacing the 1-amino-4-bromoanthraquinone-2-sulfonic acid by 1-amino-4-chloroanthraquinone-2-sulfonic acid.

I claim:—

1. The process which comprises heating a compound of the formula:—

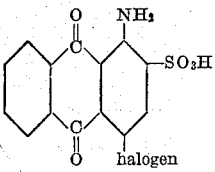

with a compound of the formula:—

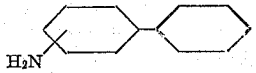

in which the nuclei may be hydrogenated or substituted by halogen atoms, alkyl-, alkoxy- or acylamino groups, in an aqueous medium.

2. The process which comprises heating to a temperature between about 70–100° C. a compound of the formula:—

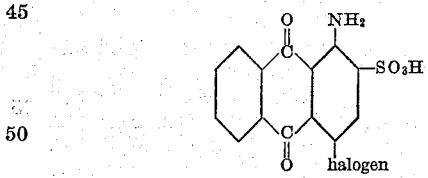

with a compound of the formula:—

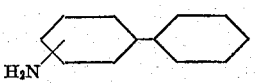

in which the nuclei may be hydrogenated or substituted by halogen atoms, alkyl-, alkoxy- or acylamino groups, in the presence of water, a water soluble alcohol, an acid binding agent and of a copper catalyst.

3. The process which comprises reacting with a compound of the formula:—

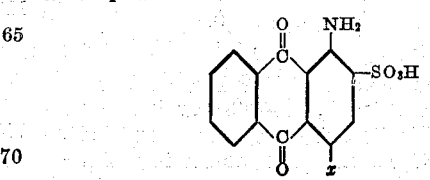

wherein $x$ means chlorine or bromine, upon monoacetylbenzidine in the presence of water, methyl- or ethyl-alcohol, of an acid binding agent and of a copper catalyst, at the boiling point of the reaction mixture.

4. The process which comprises reacting with a compound of the formula:—

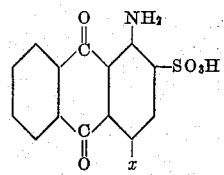

wherein $x$ means chlorine or bromine, upon 4-amino-4'-acetylamino-3.3'-dimethoxydiphenyl in the presence of water, methyl- or ethyl-alcohol, of an acid binding agent and of a copper catalyst, at the boiling point of the reaction mixture.

5. The compounds having in their free form the formula:—

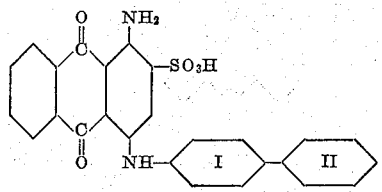

wherein the nuclei marked I and II may be hydrogenated or substituted by halogen atoms, alkyl-, alkoxy-, or acylamino groups, said compounds being in form of their alkali metal salts blue to green crystals, soluble in water, dyeing vegetable fibers strong and clear shades fast to light according to the methods usually applied for the direct dyeing of vegetable fibers.

6. The compound having in its free form the formula:—

said compound forming blue needles, dyeing cotton from an aqueous sodium sulfate bath greenish blue shades of good fastness properties.

7. The compound having in its free form the formula:—

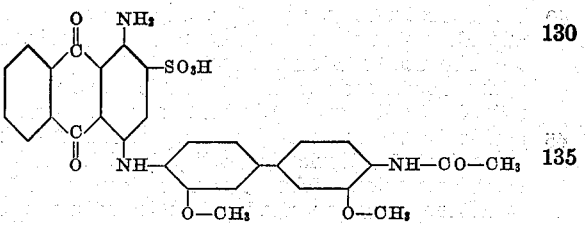

said compound forming blue needles, dyeing cotton from an aqueous sodium sulfate bath green shades of good fastness properties.

KLAUS WEINAND.